(12) United States Patent
Linne et al.

(10) Patent No.: US 7,837,816 B2
(45) Date of Patent: Nov. 23, 2010

(54) METHOD AND DEVICE FOR THE CONSTRUCTION OF A RADIAL TIRE

(75) Inventors: Stefan Linne, Wedemark (DE); Karl-Heinz Pawlick, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 973 days.

(21) Appl. No.: 11/570,245

(22) PCT Filed: May 18, 2005

(86) PCT No.: PCT/EP2005/052272

§ 371 (c)(1), (2), (4) Date: Dec. 8, 2006

(87) PCT Pub. No.: WO2006/003054

PCT Pub. Date: Jan. 12, 2006

(65) Prior Publication Data

US 2007/0261780 A1 Nov. 15, 2007

(30) Foreign Application Priority Data

Jul. 6, 2004 (DE) .................. 10 2004 032 508

(51) Int. Cl.
*B29D 30/26* (2006.01)

(52) U.S. Cl. .............. 156/132; 156/133; 156/401; 156/417

(58) Field of Classification Search .......... 156/132, 156/133.401, 417–420
See application file for complete search history.

(56) References Cited

U.S. PATENT DOCUMENTS

| | | | | |
|---|---|---|---|---|
| 3,281,305 A | * | 10/1966 | Nädler et al. | 156/401 |
| 3,418,192 A | * | 12/1968 | Nädler | 156/401 |
| 3,503,829 A | * | 3/1970 | Menell et al. | 156/401 |
| 4,470,867 A | * | 9/1984 | Caretta et al. | 156/416 |
| 4,683,021 A | * | 7/1987 | Stalter et al. | 156/415 |
| 4,859,272 A | | 8/1989 | Lovell et al. | |

(Continued)

FOREIGN PATENT DOCUMENTS

DE 1729606 B * 5/1972

(Continued)

OTHER PUBLICATIONS

International Search Report for PCT/EP2005/052272.

(Continued)

*Primary Examiner*—Geoffrey L Knable
(74) *Attorney, Agent, or Firm*—Greenblum & Bernstein P.L.C.

(57) ABSTRACT

A method for building a radial tire on a tire-building machine that has an expandable carcass drum with a cylindrical external circumference and two bellows supports with inflatable bellows. A tire inner liner and a carcass ply have projections and project beyond the edges of the carcass drum are laid and spliced on the carcass drum. The bead cores with core profiles are positioned and the projections of the carcass ply are turned up around the outsides of the bead cores by the inflation of the bellows. Expandable bellows supports are provided that are expanded for the placing and splicing of tire components so that the external surfaces of the bellows together with the external surface of the expanded carcass drum form at least essentially a uniform cylindrical load-bearing surface.

5 Claims, 4 Drawing Sheets

U.S. PATENT DOCUMENTS

| | | | |
|---|---|---|---|
| 6,390,166 B1 | 5/2002 | Roberts et al. | |
| 6,506,274 B1 | 1/2003 | Evangelista et al. | |
| 6,585,022 B1 * | 7/2003 | Rex | 156/401 |
| 2002/0179253 A1 * | 12/2002 | Kimura et al. | 156/397 |
| 2003/0041975 A1 | 3/2003 | Evangelista et al. | |
| 2006/0086451 A1 * | 4/2006 | Nakata | 156/111 |

FOREIGN PATENT DOCUMENTS

| | | |
|---|---|---|
| EP | 0348336 | 12/1989 |
| WO | WO-2004/048074 A1 * | 6/2004 |

OTHER PUBLICATIONS

English Language Translation of Written Report of the International Searching Authority.

* cited by examiner

METHOD AND DEVICE FOR THE CONSTRUCTION OF A RADIAL TIRE

BACKGROUND OF THE INVENTION

1. Field of the Invention

The invention relates to a method for building a radial tire on a tire-building machine that has an expandable carcass drum with a cylindrical external circumference and two bellows supports with inflatable bellows. A tire inner liner and a carcass ply have projections and project beyond the edges of the carcass drum which are laid and spliced on the carcass drum. Subsequently bead cores with core profiles are positioned and the lateral projections of the carcass ply are turned up around the outsides of the bead cores and the core profiles by the inflation of the bellows.

The invention further relates to a device for building a radial tire that has an inner liner, a carcass ply, bead cores with core profiles and sections of the carcass ply turned up around the bead cores and forming turn-ups. The device has an expandable carcass drum having a cylindrical outer surface and two bellows supports with inflatable bellows.

2. Discussion of Background Information

It is customary to use single-step or two-step tire-building machines for building radial tires. Two-step tire-building machines are known which operate according to the finger ply down method or an expansion drum method. With a two-step method, on the first step of the tire-building machine, the inner liner and subsequently the carcass ply are laid and spliced on an expandable carcass drum having a cylindrical external circumference. The bead cores together with core profiles are placed with the drum being expanded. This is followed by turning up the projections of the carcass ply projecting beyond the carcass drum around the bead cores and the core profiles, which is carried out with the aid of inflatable bellows. After optional further tire components are placed and sidewall profiles are placed and rolled, the tire carcass is completed and is removed from the now retracted carcass drum. The tire carcass is transported to a second building drum via a transfer device. On a separate belt drum the belt plies are completed to form the belt assembly and subsequently the one-part or multiple-part tread rubber is applied. A transfer device transports the belt/tread rubber assembly to the tire carcass and positions it over the carcass. The tire carcass is joined to the belt/tread rubber assembly by shaping and connected by rolling. With a single-step method, the production of the carcass and the completion of the green tire are carried out by finishing with the belt/tread rubber assembly on a single drum.

The bellows supports arranged at the side of the carcass drum are usually embodied such that the outsides of the uninflated bellows resting thereon are located on a cylindrical surface, the diameter of which is smaller than that of the external surface of the carcass drum in order to be able to position the bead cores together with core profiles at defined positions. The smaller diameter on the sides of the load-bearing surface formed by the carcass drum and the bellows for the inner liner and the carcass ply in these areas permits only a localized support of those rollers that are customarily used during the placing and splicing of these plies. Attempts have therefore been made to provide a more advantageous load-bearing surface for the inner liner and the carcass ply by inflating the bellows. However, the load-bearing surface resulting thereby is very irregular and a large gap forms between the carcass drum and the bellows so that there is a great risk of air pockets forming between the inner layer and the carcass ply.

SUMMARY OF THE INVENTION

The invention is directed to improve a method and a device of the type mentioned at the outset such that the placing of tire components on the carcass drum is supported, and an automatic splicing of their end sections is rendered possible.

As far as the method is concerned, expandable bellows supports are provided which are expanded for the placing and splicing of tire components so that the external surfaces of the bellows together with the external surface of the expanded carcass drum at least essentially form a uniform cylindrical load-bearing surface.

As far as the device is concerned, the bellows supports are embodied to be expandable.

Through an enlargement of the diameter by expanding the bellows supports it can be accomplished, if needed, that the external surfaces of the uninflated bellows together with the external surface of the carcass drum provide an at least essentially continuous cylindrical surface for placing and splicing tire components. Air pockets between the individual components can thus be prevented, the cycle time of the tire-building machine can be shortened and the degree of automation can be increased, since the tire components placed can be spliced automatically and no longer only by hand.

The method is particularly advantageous in the placement of the inner liner and the carcass ply in order to render possible a mechanical splicing.

The cycle time of the tire-building machine can also be shortened in other procedure steps during the building of the green tire on the carcass drum. This is the case, e.g., if the sidewall profiles are also placed and spliced with expanded bellows supports.

The bellows supports can be embodied to be expandable in a simple, expedient and functionally reliable manner. To this end the bellows supports have a number of segments that can be extended and retracted in the radial direction, the external surfaces of which together form an essentially cylindrical support for the bellows. The number of segments should be at least four, in particular twelve.

BRIEF DESCRIPTION OF THE DRAWINGS

Further features, advantages and details of the invention will now be explained in more detail based on the diagrammatic drawing, which shows exemplary embodiments.

DETAILED DESCRIPTION OF THE PRESENT INVENTION

Figure 1:
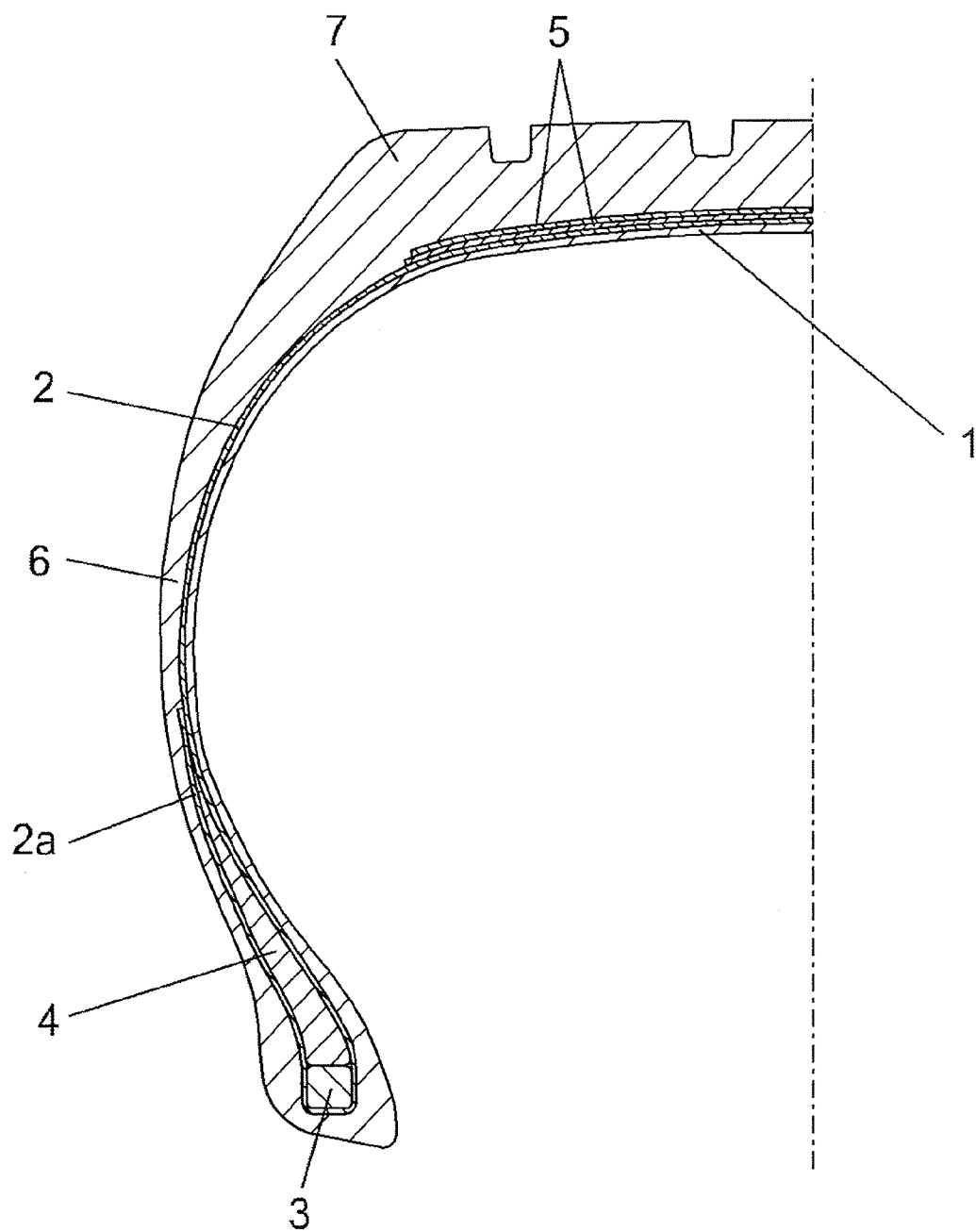
FIG. 1 shows a partial cross section through a radial tire.

FIG. 1 shows, by way of example, a partial cross section through a radial tire for automobiles. Only the main components of the tire are shown and labeled, namely an airtight inner liner 1, a carcass ply 2, bead areas with bead cores 3 and core profiles 4, a belt comprising two belt plies 5, sidewalls 6 and a profiled tread rubber 7. The carcass ply 2 of an automobile tire usually has, in particular, textile strength supports embedded in a rubber mixture. The strength supports run from bead area to bead area and are guided around the bead cores 4 from the inside outwards so that their free end sections form the so-called turn-ups 2a. The carcass ply 2 can also be embodied in a two-ply manner. The bead cores 3 are usually composed of a plurality of steel cables, the core profiles 4 connecting thereto are profiles of a relatively hard rubber mixture. In the production of the tire or its components the bead cores 3 together with the as yet unvulcanized core profiles 4 are prefabricated as a unit. This unit can be provided with a single-ply or multi-ply outer covering of a rubberized fabric, so-called bead protection strips.

FIGS. 2a through 2d show an expandable carcass drum 9 that is part of a first step of a tire-building machine. The expandable carcass drum 9 has a cylindrical external circumference and two bellows supports 10 arranged at the side of the carcass drum 9. An inflatable bellows 11 is located on the external circumference of each bellows support 10. The dot-dashed line "m" clarifies the symmetry plane of the carcass drum 9, the dashed line "a" clarifies the axis "a" of the carcass drum 9, i.e., the second halves (not shown) of the carcass drum 9, the bellows supports 10 and the bellows 11 are located below "a" and as a mirror image to "a."

Figure 3:
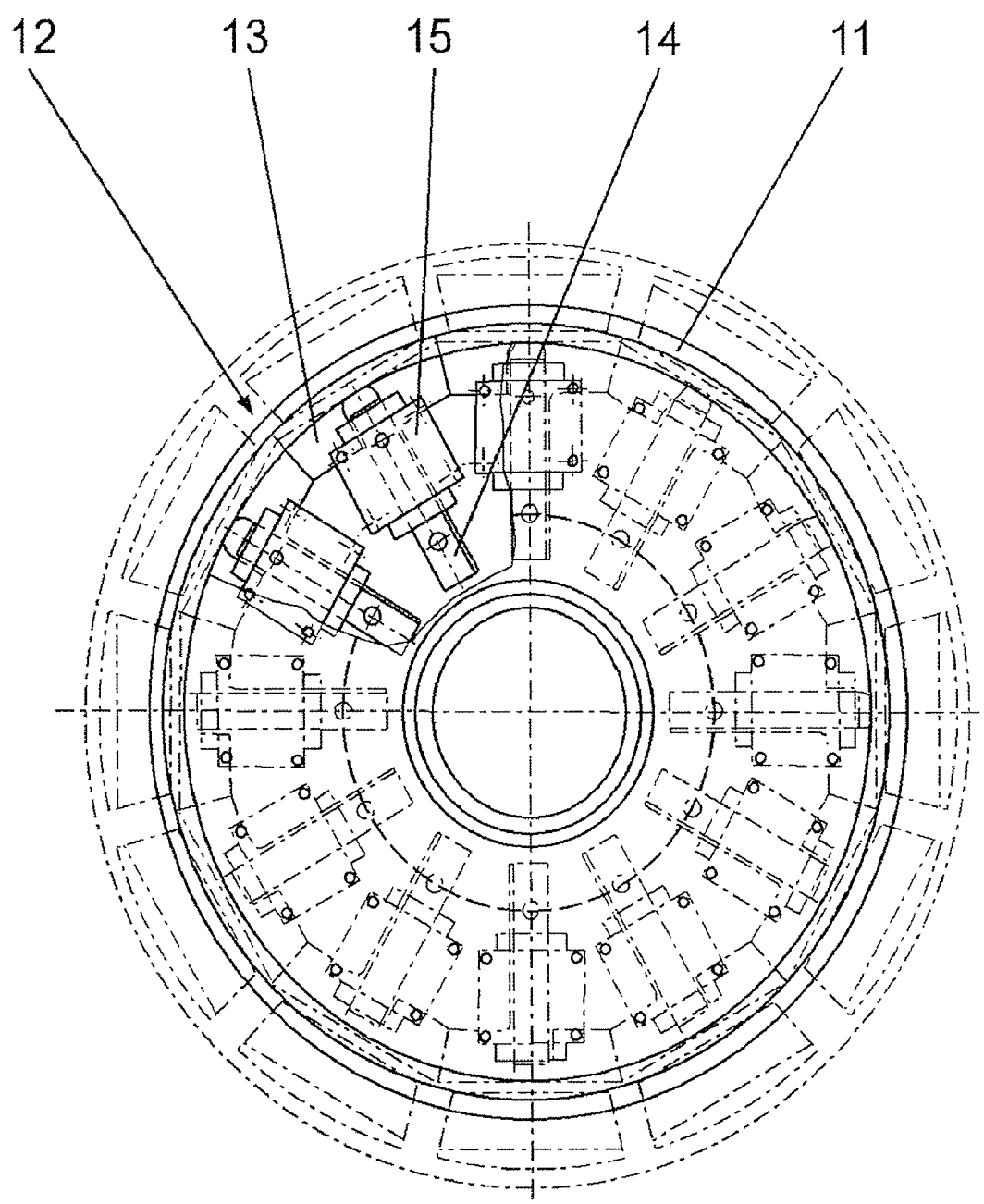

According to the invention, the bellows supports 10 are embodied to be expandable. As FIG. 3 shows, the bellows supports 10 have segments 12 that are expandable and retractable in the radial direction. In the embodiment shown, twelve segments 12 are distributed evenly over the circumference, which segments provide the support for the bellows 11 running over the circumference of the bellows supports 10. Each segment 12 is composed of bellows bearing parts 13, a guide device 14 and a support 15. The bellows bearing parts 13 are arranged on the supports 15 which are mounted on the guides 14 in a retractable and extendable manner. The mechanism provided for this can be embodied in a known manner and operate, e.g., in a pneumatic or hydraulic manner. FIG. 3 shows the segments 12 in their retracted position by solid lines, broken lines are used to show the extended position in which the external circumference of the bellows supports 10 is enlarged concentrically.

Figure 2A:
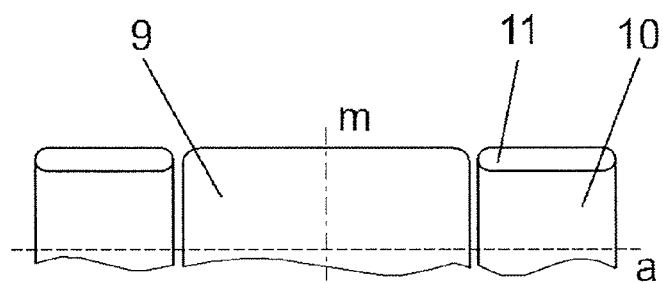
FIGS. 2a through 2d show representations of procedure steps in the building of a vehicle pneumatic tire on a tire-building machine, FIG. 3 show a view of a segmented bellows support.
Figure 2B:
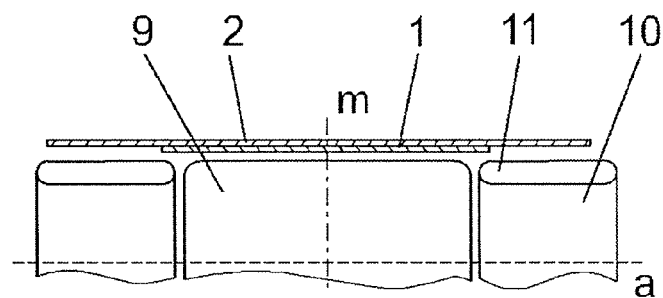

In the position shown in FIG. 2a, the bellows supports 10 as well as the carcass drum 9 are already expanded; with the cylindrical external surface of the carcass drum 9, the essentially cylindrical outsides of the uninflated bellows 11 form an at least essentially uniform cylindrical load-bearing surface. As FIG. 2b shows, the inner liner 1 and the carcass ply 2 are laid on this load-bearing surface. Their overlapping end sections can be connected to one another (spliced) by rolling. The expanded bellows supports 10 therefore support the inner liner 1 as well as the carcass ply 2 during laying and splicing, thus preventing the formation of air pockets between the inner liner 1 and the carcass ply 2.

Figure 2C:
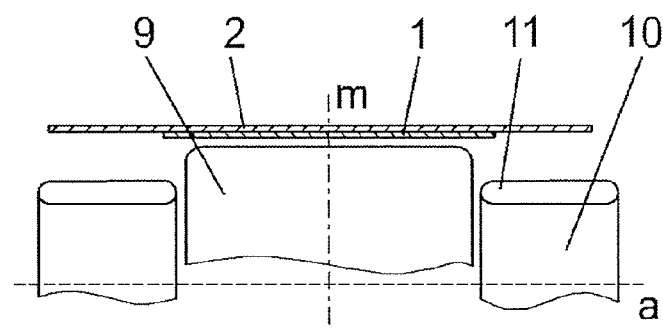
Figure 2D:
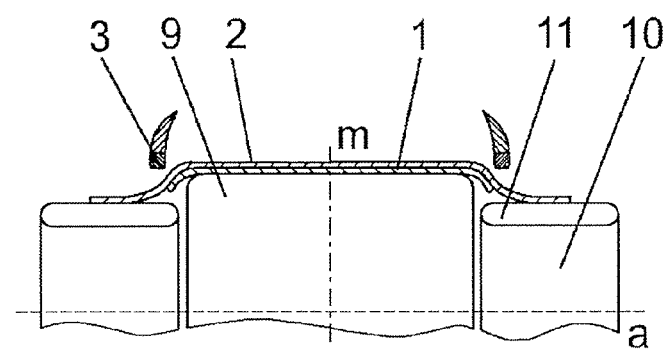

As shown in FIG. 2c, after the splicing of the carcass ply 2 and the inner liner 1, the segments 12 of the two bellows supports 10 are retracted, so that the external diameter of the bellows 11 is reduced compared to the external diameter of the carcass drum 9. The bead cores 3 together with their core profiles 4 can be placed on the projections 2a of the carcass ply 2, as shown in FIG. 2d. The bellows 11 are inflated so that a turning up of the projections 2a of the carcass ply 2 around the cores 3 and thus the production of the later carcass turn-ups takes place in a known manner.

After the turning up of the projections 2a of the carcass ply 2, the air is let out of the bellows 11. By extending the segments 14 again, it is possible to set the outsides of the bellows supports 10 of the again uninflated bellows 11 to the diameter of the tire components already placed in order to provide an overall cylindrical load-bearing surface for applying further tire components.

Figure 4:
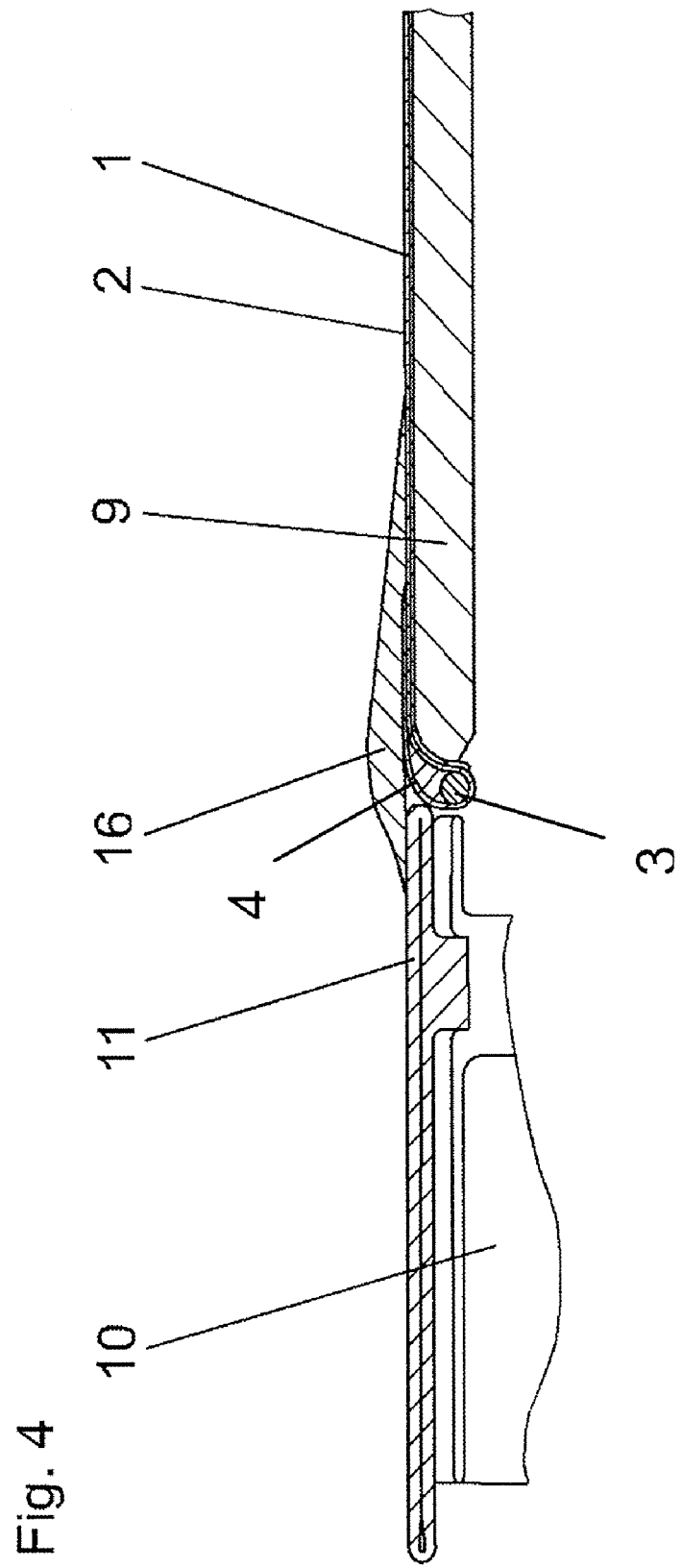
FIG. 4 shows a further process step in the building of a vehicle pneumatic tire on a tire-building machine.

FIG. 4 shows the overall cylindrical load-bearing surface for applying further tire components based on the placing of sidewall profiles 16. The cores 3 with core profiles 4 are positioned in the gap between the carcass drum 9 and the bellows supports 10. The two sidewall profiles 16 can therefore be laid over the cores 3 and core profiles 4 on an at least essentially cylindrical load-bearing surface and spliced in a simple manner, e.g., by means of rolling.

Other tire components, e.g., bead reinforcement strips, can also be laid and supported accordingly and spliced in a convenient manner on the overall cylindrical load-bearing surface obtained by the expandable bellows supports 10. The invention can thereby be used with two-step as well as single-step tire-building machines. The number of segments of the bellows supports can be more or less than twelve, but at least four.

The invention claimed is:

1. A method for building a radial tire on a tire-building machine that has an expandable carcass drum with a cylindrical external circumference and two bellows supports with inflatable bellows arranged on opposite axial sides of the expandable carcass drum, comprising:

expanding the expandable carcass drum and segments of the two bellows supports while each inflatable bellows is uninflated, wherein the expanding results in the cylindrical external surface of the expandable carcass drum and an essentially cylindrical outside surface of the uninflated bellows forming an at least essentially uniform cylindrical load-bearing surface;

after the expanding, laying and splicing an inner liner and a carcass ply having projections on the carcass drum, wherein the projections project beyond edges of the carcass drum;

after the splicing, retracting the segments of the two bellows supports so that the essentially cylindrical outside surface of the two bellows supports have a reduced diameter that is less than an external diameter of the cylindrical external surface of the expandable carcass drum;

after the retracting, positioning bead cores with core profiles on the projections of the carcass ply;

turning up the projections of the carcass ply around outsides of the bead cores by inflation of the inflatable bellows;

after the turning up, deflating the inflatable bellows; and expanding the segments of the two bellows supports with the uninflated bellows.

2. The method according to claim 1, further comprising positioning each bead core in a gap between the expandable carcass drum and one of the two bellows supports.

3. A method for building a radial tire on a tire-building machine that has an expandable carcass drum with a cylindrical external circumference and two bellows supports with inflatable bellows arranged on opposite axial sides of the expandable carcass drum, comprising:

expanding the expandable carcass drum and the two bellows supports while each inflatable bellows is uninflated, wherein the expanding results in the cylindrical external surface of the expandable carcass drum and an essentially cylindrical outside surface of the uninflated bellows forming an at least essentially uniform cylindrical load-bearing surface;

after the expanding, laying and splicing an inner liner and a carcass ply having projections on the at least essentially uniform cylindrical load-bearing surface, wherein the projections project beyond edges of the carcass drum;

after the splicing, retracting the two bellows supports so that the essentially cylindrical outside surface of the two bellows supports have a reduced diameter that is less than an external diameter of the cylindrical external surface of the expandable carcass drum;

after the retracting, positioning bead cores with core profiles on the projections of the carcass ply;

after the positioning, turning up the projections of the carcass ply around outsides of the bead cores by inflation of the inflatable bellows;

after the turning up, deflating the inflatable bellows; and after the deflating, expanding the two bellows supports with the uninflated bellows.

4. The method according to claim 3, wherein the bellows supports each have plural segments extendable and retractable in a radial direction.

5. The method according to claim 3, further comprising positioning each bead core in a gap between the expandable carcass drum and one of the two bellows supports.

* * * * *